Oct. 20, 1964 L. J. McDONALD 3,153,754
SERVOMECHANISM EMPLOYING A SHADED POLE MOTOR
Filed Oct. 9, 1961
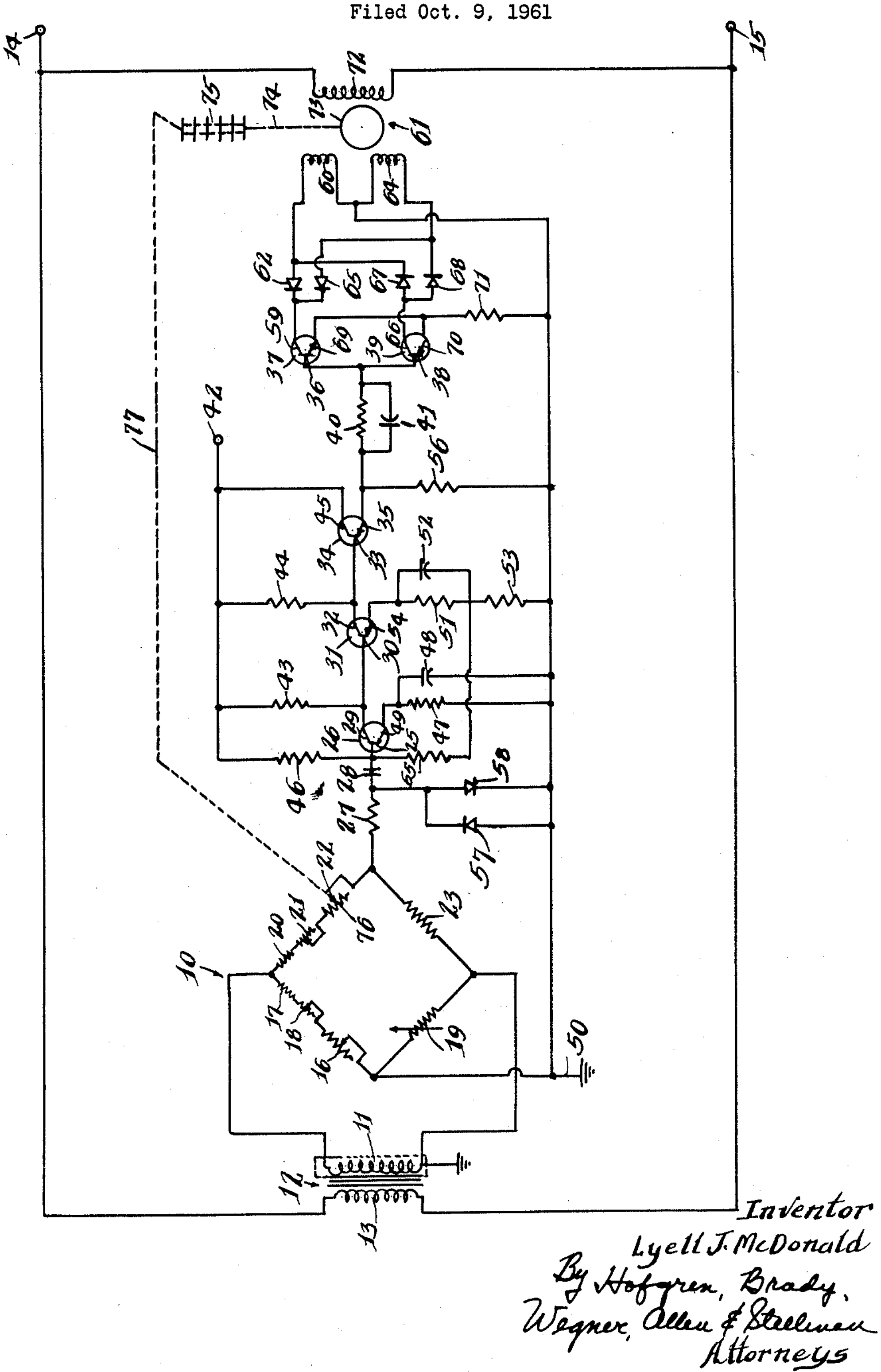
Inventor
Lyell J. McDonald
By Hofgren, Brady,
Wegner, Allen & Stellman
Attorneys United States Patent Office 3,153,754
Patented Oct. 20, 1964

3,153,754
SERVOMECHANISM EMPLOYING A SHADED POLE MOTOR

Lyell J. McDonald, Elkhart, Ind., assignor to Penn Controls Inc., a corporation of Indiana Filed Oct. 9, 1961, Ser. No. 143,902
11 Claims. (Cl. 318—28)

The present invention relates to servomechanisms and more particularly to servomechanisms utilizing an electronic signal to position the shaft of an electric motor.

A servomechanism normally consists of three essential components. The first is a means of detecting the error between the actual position of a control shaft and its desired value as given by a command shaft. The second essential component is a means of amplifying the voltage signal or actuating signal produced by the error detecting means. The third element is a source of power or prime mover which is utilized to bring about the correct action. One of the more widely used types of servomechanisms comprises a resistance bridge as an error detecting means, an electronic amplifier to amplify the actuating signal produced by the bridge and an electric motor driven by the output of the amplifier. In the construction of such servomechanisms, it has been customary to provide an amplifier which utilizes vacuum tubes and has a transformer coupling the last stage of the amplifier to a winding of the motor.

The coupling transformer between the last stage of the amplifier and the motor has been one of the more expensive items in the construction of such servomechanisms. Therefore, the elimination of such a transformer would make this type of servomechanism more economical to construct. In addition the elimination of the transformer would represent a weight reduction in many applications. If the transformer could be eliminated, it would be desirable to be able to utilize the present state of the art in the design of transistor amplifiers to further reduce the cost of construction and to increase the reliability of the servomechanism.

Therefore, an object of the present invention is to provide a new and improved servomechanism.

Another object is to provide a servomechanism which includes an electronic amplifier driving an electric motor wherein the requirement of a transformer as a coupling means between the output of the amplifier and the winding of the motor is eliminated.

An additional object is to provide a servomechanism having an electronic amplifier constructed with transistors, for amplifying an actuating signal.

A further object of the present invention is to provide a servomechanism having an electronic amplifier driving an electric motor wherein the need for a coupling transformer between the amplifier and the motor is eliminated and the stages of the amplifier utilize transistors instead of vacuum tubes.

Still another object of the present invention is to provide a shaded pole motor as the prime mower in a servomechanism and a transistorized electronic amplifier for driving the shaded pole motor wherein the coupling circuit between the output of the amplifier and the windings of the motor does not require the employment of a transformer.

Further objects and advantages will become apparent from the following detailed description taken in connection with the accompanying drawing.

The drawing is a schematic circuit diagram of an embodiment of the present invention.

While this invention is susceptible of embodiments in many different forms, there is shown in the drawing and will herein be described in detail, an embodiment of the present invention with the understanding that the present disclosure is to be considered as an exemplification of the principles of the invention and is not intended to limit the invention to the embodiment illustrated. The scope of the invention will be pointed out in the appended claims.

Referring now to the drawing, a resistance bridge 10 is connected across a secondary winding 11 of a transformer 12. A primary coil 13 of the transformer 12 is connected to terminals 14 and 15. The terminals 14 and 15 are connected to a source of 230-volt, 60-cycle alternating current (not shown). The bridge 10 has a first leg composed of a 500-ohm variable resistor 16 connected in series with a 1500-ohm fixed resistor 17 and a 500-ohm calibration variable resistor 18. This first leg is connected in series with a second leg composed of a variable resistor 19 across the secondary coil 11. The variable resistor 19 is mechanically connected to a sensing element (not shown), and the variable resistor 16 is mechanically connected to a controlled quantity value selector (not shown). A third leg of the bridge 10 is composed of a 1725-ohm resistor 20, a 500-ohm calibration variable resistor 21 and a 100-ohm variable resistor 22 connected in series. This third leg of the bridge 10 is connected in series across the secondary coil 11 with a fourth leg composed of a 2,000-ohm fixed resistor 23. The junction of the resistor 22 and the resistor 23 is connected to a base 25 of a PNP transistor 26 through a 2,200-ohm resistor 27 and a 50-$\mu$fd. condenser 28. A collector 29 of the transistor 26 is connected to a base 30 of a PNP transistor 31. A collector 32 of the transistor 31 is connected to a base 33 of a PNP transistor 34. An emitter 35 of the transistor 34 is connected to a base 36 of a transistor 37 and to a base 38 of a transistor 39 through a 1,500-ohm resistor 40 which has a 150-$\mu$fd. condenser 41 connected in parallel.

The collector 29 is connected to a terminal 42 through an 18,000-ohm resistor 43. The collector 32 is connected to the terminal 42 through a 2,700-ohm resistor 44. A collector 45 of the transistor 34 is connected directly to the terminal 42. The terminal 42 is connected to a source of negative D.C. voltage (not shown). A 39,000-ohm resistor 46 connects the terminal 42 to the base 25 of the transistor 26. A 6,200-ohm resistor 47 is connected in parallel with a 50-$\mu$fd. condenser 48 between an emitter 49 of the transistor 26 and a circuit ground 50. A 3,000-ohm resistor 51 and a 50-$\mu$fd. condenser 52, connected in parallel with the resistor 51, are connected in series with an 82-ohm resistor 53 between an emitter 54. A 9,100-ohm resistor 55 is connected between the base 25 of the transistor 26 and the junction of the resistors 51 and 53 to provide a feedback loop from the second stage of the amplifier to the input of the first stage. A 2,700-ohm resistor 56 is connected between the emitter 35 of the transistor 34 and the circuit ground 50. A pair of diodes 57 and 58 are connected in parallel with reversed orientation to each other between a junction of the resistor 27 and the condenser 28 and the circuit ground 50.

A collector 59 of the transistor 37 is connected to one end of a field winding 60 of a shaded pole motor 61 through a diode 62. The collector 59 is also connected to one end of a second field winding 64 of the motor 61 through a diode 65. The other ends of the field windings 60 and 64 are connected to each other and to the circuit ground 50. A collector 66 of the transistor 39 is connected through a diode 67 to the aforementioned one end of the field winding 60. The collector 66 is also connected through a diode 68 to the aforementioned one end of the field winding 64. An emitter 69 of the transistor 37 and an emitter 70 of the transistor 39 are connected to the circuit ground 50 through a 1-ohm resistor 71.

A main field winding 72 is connected between the terminals 14 and 15.

An armature 73 of the motor 61 has a drive shaft 74 with a set of cams 75 mounted thereon. The position of a slider 76 of the variable resistor 22 is controlled by the position of the shaft 74 through a mechanical linkage 77. The mechanical linkage 77 can be any system of gearing, shafts or flexible cable. In some applications it will be desirable to have the shaft 74 actually constructed of two shafts which are connected by reduction gearing.

A 230-volt, 60-cycle alternating current is supplied through the terminals 14 and 15 to the main winding 72 of the shaded pole motor 61 and to the primary coil 13 of the transformer 12. The transformer 12 steps down the voltage to 60 volts. The resistor 19 is part of a sensing element which senses the value of a particular quantity such as temperature. The variable resistor 18 is mechanically connected to a control selector which is utilized to indicate the desired value of the quantity. The resistance of the variable resistor 22 is proportional to the position of the shaft 74. Thus an actuation signal is developed between the two sides of the bridge 10 which is applied between the base 25 of the transistor 26 and circuit ground 50. Since the bridge is activated by a 60-cycle alternating current, the actuation signal will be a 60-cycle alternating signal. The signal is amplified by the three stages of amplification composed of the three transistors 26, 31 and 34. The amplified actuating signal is carried from the emitter 35 of the last stage transistor 34 to the base 36 of the NPN transistor 37 and to the base 38 of the PNP transistor 39.

The emitter of the PNP transistor 34 is always negative in respect to the circuit ground 50. This polarity is correct to turn on the PNP transistor 39, but it would keep the NPN transistor 37 cut off at all times if the condenser 41 were not in the circuit. The condenser 41 charges to a voltage almost equal to the average voltage appearing across the resistor 56. In the absence of an actuating signal from the bridge 10 the voltage from the bases 36 and 38 to circuit ground 50 is essentially zero. When an actuating signal causes the voltage at the emitter 35 to become less negative with respect to ground 50, then the voltage across resistor 56 the voltage from the bases 36 and 38 becomes positive with respect to ground 50. Thus the transistor 37 will be turned on and the transistor 39 will be cut off. When the emitter 35 becomes more negative than the voltage across the resistor 56, the voltage from the bases 36 and 38 becomes negative with respect to ground, cutting off transistor 37 and turning on transistor 39. The capacitor 41 must be large enough to accomplish good signal coupling for its charge should remain essentially fixed during a half cycle at the actuating signal frequency. The resistor 40 should be small enough to prevent thermal runaway and yet as large as possible. The resistor 71 aids thermal stabilization.

If the actuating signal from the bridge 10 is positive with respect to ground 50 at the time the voltages induced across the shaded windings 60 is positive with respect to ground, the transistor 37 will conduct current through the diode 62, the shaded winding 60, ground 50, and the resistor 71. This current flow is induced by the current flow in the winding 72, and the voltage making it possible for conduction between the collector 59 and the emitter 69 of the transistor 37 is the simultaneous positive actuating signal on the base 36. The voltage at the end of the winding 64, which is connected to the diode 65, is negative relative to ground at this time. Therefore, the diode 65 blocks the passage of current from the winding 64 to the collector 59 of the transistor 37. During the abovementioned conditions the base 38 of the PNP transistor 39 is also positive to cut off collector current. Thus the transistor 39 is prevented from conducting current between its collector 66 and its emitter 70.

When the voltage in hte shaded winding 60 and the actuating signal are both negative, the voltage polarity across the windings 60 and 64 is reversed and the bases of the transistors 37 and 39 are negative. This situation causes current to flow between the emitter 70 and the collector 66 of transistor 39, through diode 67, through winding 60 and through resistor 71. During this half cycle the diode 68 prevents a current flow from the winding 64. Since the base 36 of the NPN transistor 37 is negative during this half cycle there will be no current flow between the emitter 69 and the collector 59 of the transistor 37. Thus with the actuating signal having the same simultaneous polarities as the alternating current flow in the main field of the motor 61, current flow is produced only in the shaded winding 60 on both half cycles.

If the bases of the transistors 37 and 39 are negative when the voltage produced across the winding is negative, current will be conducted by transistor 39, through diode 68, through winding 64, and through resistor 71. When the actuating signal swings positive and the voltage across the winding 64 is positive, current will again flow through the winding 64 since the transistor 37 will conduct current via the diode 65 and the resistor 71. Therefore, when the two signals have opposite polarities only the winding 64 will have current conducted through it. Thus the motor runs in one direction when the actuating signal and the alternating current in the main coil 72 are in phase and in the opposite direction when they are out of phase.

The armature of the motor 61 rotates the shaft 74 until an actuating signal is no longer received from the bridge. The cams 75 on shaft 74 can be utilized to turn on or off or increase and decrease the rate of operation of various types of machinery. A typical application of the servomechanism described herein would be as a control system for a refrigeration railroad car. In such an application the variable resistor 19 would be controlled by some types of thermo-sensing means. The variable resistance of resistor 18 would be set by a dial calibrated in terms of temperature. The set of cams 75 would be utilized to turn on and off refrigeration compressors and to increase and decrease their rate of operation. Depending upon the temperature of the car relative to the desired temperature as set by the resistor 18 the alternating signal produced by the bridge will be in or out of phase with the alternating current in the winding 72. If the car is warmer than desired the motor 61 rotates the cams in one direction to increase the cooling capacity of the refrigeration system, while if the car is colder than desired the motor is rotated in the opposite direction to cut down the amount of refrigeration being supplied to the car. If a heating source is provided in the car, one of the set of cams 75 could activate the heating source whenever the car is colder than desired by an amount greater than a predetermined temperature difference. Those skilled in the art will recognize that the described servomechanism can be utilized to control not only refrigeration systems but numerous other types of systems including heating systems, pressurization systems, and lighting systems.

I claim:

1. A control circuit for a shaded pole motor, having a main field winding adapted to be connected to a means for producing an alternating current, a first shading winding and a second shading winding comprising a means for producing an alternating control signal adapted to be connected to the means for producing an alternating current and a switching means which closes a first circuit through said first winding to permit current to flow therethrough during a positive half cycle of said alternating current and closes a second circuit through said first winding to permit current flow therethrough during a negative half cycle of said alternating current whenever said control signal is in phase with said alternating current and which closes a first circuit through said second winding to permit current flow therethrough during a positive half cycle of said alternating current and closes a second circuit through said second winding to permit current flow therethrough during a negative half cycle of said alternating current whenever said control signal is out of phase with said alternating current, said circuits through said first winding being open whenever a circuit through said second winding is closed and said circuits through said second winding being open whenever a circuit through said first winding is closed.

2. A control circuit for a shaded pole motor, having a rotatable shaft, an armature mounted on the shaft, a main field winding adapted to be connected to a means for producing an alternating current, a first shading winding positioned to produce rotation of the armature in one direction whenever current is allowed to flow through said first winding, and a second shading winding positioned to provide rotation of the armature in the opposite direction whenever current is allowed to flow in said second winding, comprising a means for producing an alternating control signal adapted to be connected to the means for producing an alternating current and a switching means which closes a first circuit through said first winding to permit current to flow therethrough during a positive half cycle of said alternating current and closes a second circuit through said first winding to permit current flow therethrough during a negative half cycle of said alternating current whenever said control signal is in phase with said alternating current and which closes a first circuit through said second winding to permit current flow therethrough during a positive half cycle of said alternating current and closes a second circuit through said second winding to permit current flow therethrough during a negative half cycle of said alternating current whenever said control signal is out of phase with said alternating current, said circuits through said first winding being open whenever a circuit through said second winding is closed and said circuits through said second winding being open whenever a circuit through said first winding is closed.

3. A control circuit for a shaded pole motor, having a main field winding adapted to be connected to a means for producing an alternating current, a first shading winding and a second shading winding, comprising a PNP transistor having a base, a collector and an emitter connected for common emitter operation, an NPN transistor having a base, a collector and an emitter connected for common emitter operation, means for applying an alternating signal between said bases and said emitters, circuit means for connecting each said shading winding to each said transistor to allow current to flow only through the said first shading winding whenever said alternating signal is in phase with the alternating current flowing through said main field and to flow only through the second winding whenever said alternating signal is out of phase with the alternating current flowing through said main field winding.

4. A control circuit for a shaded pole motor, having a first shading winding and a second shading winding comprising a PNP transistor having a base, a collector and an emitter, an NPN transistor having a base, a collector and an emitter, a means for applying an alternating signal between said bases and said emitter, a first diode connected in series with the collector of said PNP transistor, said first winding and the emitter of said PNP transistor, a second diode connected in series with the collector of said PNP transistor, said second winding and the emitter of said PNP transistor, a third diode connected in series with the collector of said NPN transistor, said first winding and the emitter of said NPN transistor, and a fourth diode connected in series with the collector of said NPN transistor, said second winding and the emitter of said NPN transistor.

5. A control circuit for a shaded pole motor, having a rotatable shaft, an armature mounted on the shaft, a main field winding adapted to be connected to a means for producing an alternating current, a first shading winding positioned to produce rotation of the armature in one direction whenever current is allowed to flow through said first winding, and a second shading winding positioned to provide rotation of the armature in the opposite direction whenever current is allowed to flow in said second winding, comprising a PNP transistor having a base, a collector and an emitter, an NPN transistor having a base, a collector and an emitter, means for applying an alternating signal between said bases and said emitters, a first diode connected in series with the collector of said PNP transistor, said first winding and the emitter of said PNP transistor, a second diode connected in series with the collector of said PNP transistor, said second winding and the emitter of said PNP transistor, a third diode connected in series with the collector of said NPN transistor, said first winding and the emitter of said NPN transistor, and a fourth diode connected in series with the collector of said NPN transistor, said second winding and the emitter of said NPN transistor.

6. In a servomechanism having an error detecting means for producing alternating control signals, the combination of a shaded pole motor having a first shading winding and a second shading winding, and a switching circuit connected to an output of said error detecting means composed of a PNP transistor having a base, a collector and an emitter, an NPN transistor having a base, a collector and an emitter, said control signals being applied between said bases and said emitters of said transistors, a first diode connected in series with the collector of said PNP transistor, said first winding and the emitter of said PNP transistor, a second diode connected in series with the collector of said PNP transistor, said second winding and the emitter of said PNP transistor, a third diode connected in series with the collector of said NPN transistor, said first winding and the emitter of said NPN transistor and a fourth diode connected in series with the collector of said NPN transistor, said second winding and the emitter of said NPN transistor.

7. In a servomechanism having an error detecting means for producing alternating control signals, the combination of a shaded pole motor having a rotatable shaft, an armature mounted on said shaft, a main field winding, a first shading winding positioned to produce rotation of the shaft in one direction whenever a current is flowing through the first winding and a second shading winding positioned to produce rotation of the shaft in the opposite direction whenever a current is flowing in the second winding and a switching circuit connected to an output from said error detecting means composed of a PNP transistor having a base, a collector and an emitter, an NPN transistor having a base, a collector and an emitter, said signals being applied between said bases and said emitters of said transistors, a first diode connected in series with the collector of said PNP transistor, said first winding and the emitter of said PNP transistor, a second diode connected in series with the collector of said PNP transistor, said second winding and the emitter of said PNP transistor, a third diode connected in series with the collector of said NPN transistor, said first winding and the emitter of said NPN transistor and a fourth diode connected in series with the collector of said NPN transistor, said second winding and the emitter of said NPN transistor.

8. A servomechanism in accordance with claim 7 wherein said shaft controls the operation of a refrigeration system and said detecting means is composed of a resistance bridge having the resistance in one leg varied by a temperature sensitive device, having the resistance in a second leg manually varied in accordance with desired temperatures and having the resistance in a third leg varied in accordance with the rotational position of said shaft.

9. A servomechanism comprising an error detecting means for producing alternating voltage signals; an amplifier connected to said error detecting means to amplify the alternating voltage signals; a shaded pole motor having a rotatable shaft, an armature mounted on said shaft, a main field winding, an alternating current flowing through said main field winding, a first shading winding positioned to produce rotation of the shaft in one direction whenever a current is flowing through the first winding and a second shading winding positioned to produce rotation of the shaft in the opposite direction whenever a current is flowing in the second winding; a circuit connected to said amplifier composed of a PNP transistor having a base, a collector and an emitter, an NPN transistor having a base, a collector and an emitter, said amplified signals being applied between said bases and said emitters of said transistors, a first diode connected in series with the collector of said PNP transistor, said first winding and the emitter of said PNP transistor, a second diode connected in series with the collector of said PNP transistor, said second winding and the emitter of said PNP transistor, a third diode connected in series with the collector of said NPN transistor, said first winding and the emitter of said NPN transistor and a fourth diode connected in series with the collector of said NPN transistor, said second winding and the emitter of said NPN transistor; and means for transmitting the position of said shaft to said sensing means.

10. A servomechanism adapted to receive alternating electrical current from a means of producing alternating current comprising an error detecting means for producing alternating voltage signals connected across said means of producing alternating current; an amplifier connected to said error detecting means to amplify the alternating voltage signals; a shaded pole motor having a rotatable shaft, an armature mounted on said shaft, a main field winding connected across said means of producing alternating current, a first shading winding positioned to produce rotation of the shaft in one direction whenever a current is flowing through the first winding and a second shading winding positioned to produce rotation of the shaft in the opposite direction whenever a current is flowing in the second winding; a circuit connected to said amplifier composed of a PNP transistor having a base, a collector and an emitter, an NPN transistor having a base, a collector and an emitter, said amplified alternating voltage signals being applied betwen said bases and said emitters of said transistors, a first diode connected between the collector of said PNP transistor and one end of said first winding, a second diode connected between the collector of said PNP transistor and one end of said second winding, a third diode connected between the collector of said NPN transistor and said one end of said first winding and a fourth diode connected between the collector of said NPN transistor and said one end of said second winding, the other ends of said first and second windings being conected to the emitters of said PNP and NPN transistors; and means for transmitting the position of said shaft to said sensing means.

11. A servomechanism adapted to receive alternating electrical current from a means of producing alternating current comprising an error detecting means composed of a resistance bridge connected across said means of producing alternating current; a transistor amplifier connected to said bridge to amplify alternating voltage signals produced by said bridge; a shaded pole motor having a rotatable shaft, an armature mounted on said shaft, a main field winding connected across said source of alternating electrical potential, a first shading winding positioned to produce rotation of the shaft in one direction whenever a current is flowing through the first winding and second shading winding positioned to produce rotation of the shaft in the opposite direction whenever a current is flowing in the second winding; a circuit connected to said amplifier composed of a PNP transistor having a base, a collector and an emitter, an NPN transistor having a base, a collector and an emitter, said amplified alternating voltage signals being applied between said bases and said emitters of said transistors, a first diode connected between the collector of said PNP transistor and one end of said first winding, a second diode connected between the collector of said PNP transistor and one end of said second winding, a third diode connected between the collector of said NPN transistor and said one end of said first winding, a fourth diode connected between the collector of said NPN transistor and said one end of said second winding, and a resistor connected between the other ends of said first and second windings and the emitters of said PNP and NPN transistors; and a means of controlling the resistance of a portion of said bridge connected to said shaft.

References Cited in the file of this patent

UNITED STATES PATENTS

| | | |
|---|---|---|
| 2,452,769 | Lang | Nov. 2, 1948 |
| 2,529,469 | Gray | Nov. 7, 1950 |
| 2,924,763 | Cibelius | Feb. 9, 1960 |
| 3,051,882 | Stoudenmire | Aug. 28, 1962 |